(12) United States Patent
Chen et al.

(10) Patent No.: US 10,007,877 B2
(45) Date of Patent: Jun. 26, 2018

(54) BOLTZMANN MACHINE CIRCUIT

(71) Applicant: FUJITSU LIMITED, Kawasaki-shi, Kanagawa (JP)

(72) Inventors: Yanfei Chen, Yokohama (JP); Sanroku Tsukamoto, Setagaya (JP); Hirotaka Tamura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 155 days.

(21) Appl. No.: 15/130,377

(22) Filed: Apr. 15, 2016

(65) Prior Publication Data

US 2017/0004398 A1 Jan. 5, 2017

(30) Foreign Application Priority Data

Jun. 30, 2015 (JP) ................ 2015-131035

(51) Int. Cl.
*G06N 3/08* (2006.01)

(52) U.S. Cl.
CPC ................ *G06N 3/08* (2013.01)

(58) Field of Classification Search
CPC ....................................................... G06N 3/08
USPC ........................................................... 706/25
See application file for complete search history.

(56) References Cited

U.S. PATENT DOCUMENTS

| 6,469,957 B1 * | 10/2002 | Savord | ................ | G01N 29/346 367/137 |
| 2013/0176156 A1 | 7/2013 | Danjo | | |
| 2014/0132437 A1 | 5/2014 | Danjo | | |

FOREIGN PATENT DOCUMENTS

| JP | 02-027493 | 1/1990 |
| JP | 2013-143626 | 7/2013 |
| JP | 2014-096769 | 5/2014 |

* cited by examiner

*Primary Examiner* — Hoai V Ho
(74) *Attorney, Agent, or Firm* — Fujitsu Patent Center

(57) ABSTRACT

A Boltzmann machine circuit includes: a plurality of circuits each circuit configured to add one or more first values based on one or more outputs of one or more circuits which are included in the plurality of circuits and are other than the circuit and convert an addition result into an analog signal, compare the analog signal with a second value, and output a comparison result; a plurality of arithmetic circuits configured to multiply the respective comparison results by respective weight values and generate the first values; and a control circuit configured to amplify an amplitude of the analog signal generated by each of the plurality of circuits.

6 Claims, 10 Drawing Sheets

BOLTZMANN MACHINE CIRCUIT

CROSS-REFERENCE TO RELATED APPLICATION

This application is based upon and claims the benefit of priority of the prior Japanese Patent Application No. 2015-131035, filed on Jun. 30, 2015, the entire contents of which are incorporated herein by reference.

FIELD

The embodiment discussed herein is related to a Boltzmann machine circuit and a method for controlling a circuit.

BACKGROUND

A Boltzmann machine, which is one type of neural network, performs high-speed processing for a multi-variable optimization problem, pattern recognition, or the like, which a von Neumann type computer does not excel.

The relevant technique is disclosed in Japanese Laid-open Patent Publication No. 2-27493, Japanese Laid-open Patent Publication No. 2014-96769, or Japanese Laid-open Patent Publication No. 2013-143626.

SUMMARY

According to an aspect of the embodiments, a Boltzmann machine circuit includes: a plurality of circuits each circuit configured to add one or more first values based on one or more outputs of one or more circuits which are included in the plurality of circuits and are other than the circuit and convert an addition result into an analog signal, compare the analog signal with a second value, and output a comparison result; a plurality of arithmetic circuits configured to multiply the respective comparison results by respective weight values and generate the first values; and a control circuit configured to amplify an amplitude of the analog signal generated by each of the plurality of circuits.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

For example, if a Boltzmann machine is implemented as a simulation, an increase in the number of units included in the Boltzmann machine or in the number of coupled units may lead to an increase in the computation time. Therefore, as the scale of a Boltzmann machine expands to some extent, a simulation may become impractical.

For example, in a Boltzmann machine, in order to reduce the occurrence of cases where a solution is captured into a local solution, a technique called simulated annealing is used in which the probability that each unit outputs a value of 1 is changed using a temperature parameter. For example, a Boltzmann machine includes many portions where analog signals are used, and generates an input value of each unit by varying the amplitude of noise produced in a random noise generator by using an amplifier in order to change the probability, and therefore the circuit scale may increase.

A Boltzmann machine is a network of units coupled to each other, and the energy of the network is defined, for example, by the following equation (1).

$$E(w, b, s) = \sum_{i=1}^{n} b_i s_i + \sum_{i,j \in Edges} w_{ij} s_i s_j \qquad (1)$$

In equation (1), n represents the number of units, $w_{ij}$ represents the coupling coefficient (hereinafter referred to as a weight value) between i-th unit and j-th unit, and $s_i$ and $s_j$ represent the respective states (0 or 1) of the i-th unit and the j-th unit. In equation (1), $b_1$ represents the threshold of the i-th unit. In equation (1), the first term represents an integral of the product of the state and the threshold of each of n units. The second term represents an integral of the product of the states of the i-th unit and the j-th unit included in a set Edges, which is composed of n units, and the weight value between the i-th and j-th units. One of the first term and the second term may be removed.

In a Boltzmann machine, simulated annealing is used in order to determine the state of each unit in which energy E expressed by equation (1) is smallest when some threshold and weight value are given.

Figure 1:
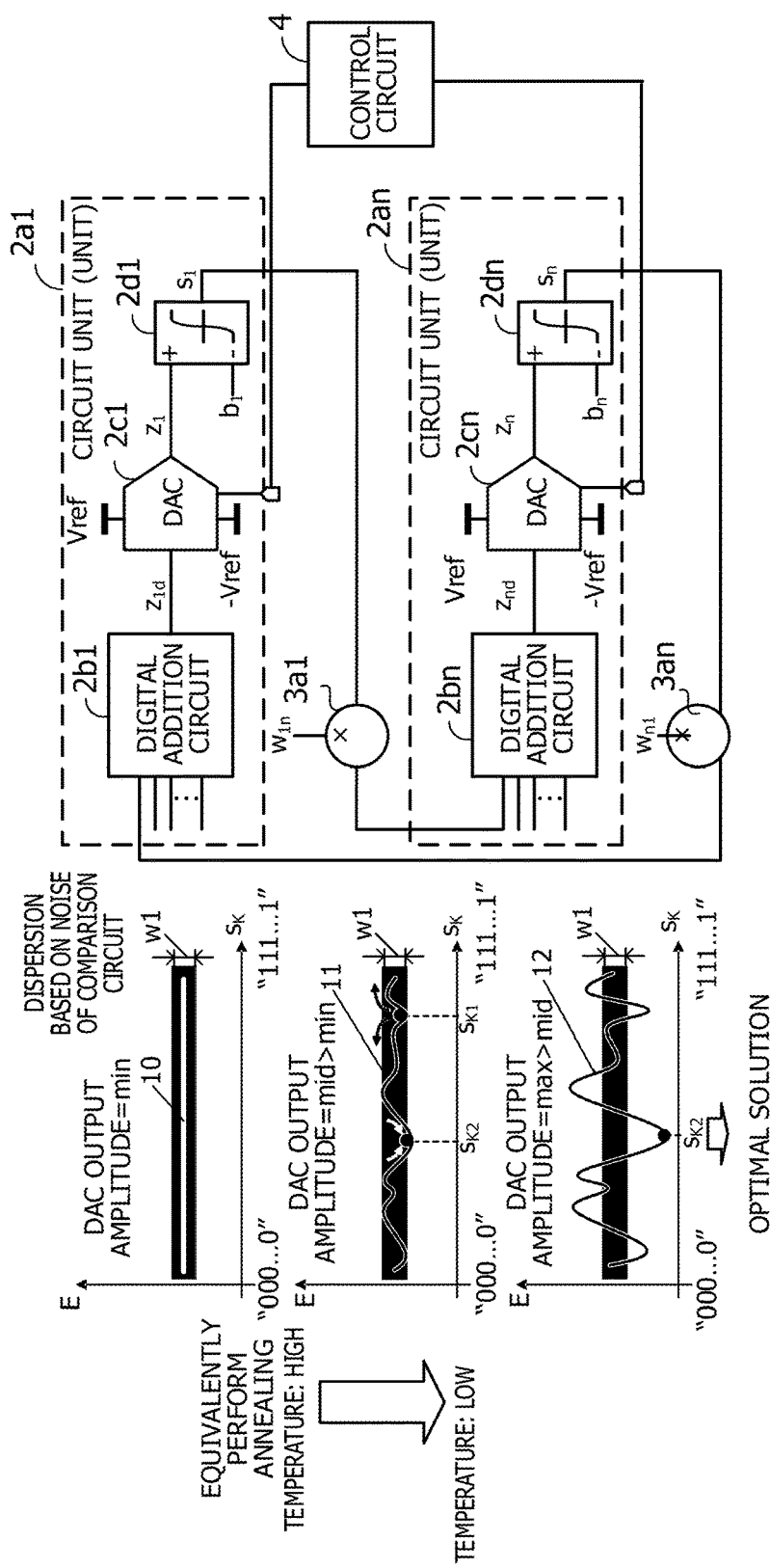
FIG. 1 illustrates an example of a Boltzmann machine circuit.

A Boltzmann machine circuit may be a circuit in which such a Boltzmann machine as described above is implemented. FIG. 1 illustrates an example of a Boltzmann machine circuit.

A Boltzmann machine circuit 1 includes circuit units 2a1 to 2an, digital arithmetic circuits 3a1 to 3an, and a control circuit 4. The circuit units 2a1 to 2an may correspond to n units included in the network of a Boltzmann machine. Each of the circuit units 2a1 to 2an adds values based on outputs of circuit units other than the circuit unit among the circuit units 2a1 to 2an, converts the addition result to an analog signal, and outputs a result of comparison of the analog signal with a threshold.

For example, the circuit units 2a1 and 2an may include digital addition circuits 2b1 and 2bn, digital-analog converters (hereinafter referred to as DACs) 2c1 and 2cn, and comparators 2d1 and 2dn.

The digital addition circuit 2b1 adds digital values based on outputs of circuit units other than the circuit unit 2a1 among the circuit units 2a1 to 2an. The digital addition circuit $2bn$ adds digital values based on outputs of circuit units other than the circuit unit $2an$ among the circuit units $2a1$ to $2an$.

The DAC $2c1$ converts an addition result $z_{1d}$ output from the digital addition circuit $2b1$ to an analog signal $z_1$. The DAC $2cn$ converts an addition result $z_{nd}$ output from the digital addition circuit $2bn$ to an analog signal $z_n$. In FIG. 1, the DACs $2c1$ and $2cn$ may be multiplying DACs that convert the addition results $z_{1d}$ and $z_{nd}$ to analog signals $z_1$ and $z_n$ based on reference voltages Vref and −Vref.

The comparator $2d1$ outputs a comparison result of 1 or 0 based on a comparison between the analog signal $z_1$ and the threshold $b_1$, as a state $s_1$ of the circuit unit $2a1$. The comparator $2dn$ outputs a comparison result of 1 or 0 based on a comparison between the analog signal $z_n$ and the threshold $b_n$, as a state $s_n$ of the circuit unit $2an$. The thresholds $b_1$ and $b_n$ may be, for example, thresholds held in advance in a register or the like, or may be outputs of any of the circuit units $2a1$ to $2an$.

Among the circuit units $2a1$ to $2an$, circuit units other than the circuit units $2a1$ and $2an$ may include components similar to those of the circuit units $2a1$ and $2an$. The digital arithmetic circuits $3a1$ to $3an$ are, for example, multiplication circuits, which generate digital values obtained by multiplying the respective outputs of the circuit units $2a1$ to $2an$ by weight values obtained by learning. For example, the digital arithmetic circuit $3a1$ multiplies an output (the state $s_1$) of the circuit unit $2a1$ by a weight value $w_{1n}$ to generate a digital value, and supplies the digital value to the circuit unit $2an$. The digital arithmetic circuit $3an$ multiplies an output (the state $s_n$) of the circuit unit $2an$ by the weight value $w_{n1}$ to generate a digital value, and supplies the digital value to the circuit unit $2a1$. The weight values $w_{1n}$ and $w_{n1}$ may be 0.

In FIG. 1, one of the digital arithmetic circuits $3a1$ to $3an$ is provided to each of the circuit units $2a1$ to $2an$. The output of each of the circuit units $2a1$ to $2an$ is supplied to n−1 circuit units, and therefore n−1 digital arithmetic circuits may be provided.

The control circuit 4 amplifies the amplitudes of the analog signals $z_1$ to $z_n$ generated by the circuit units $2a1$ to $2an$ to equivalently perform annealing. The control circuit 4 may be, for example, a processor (a central processing unit (CPU) or the like).

For example, the control circuit 4 gradually increases the gain of the DACs $2c1$ to $2cn$ to amplify the amplitudes of the analog signals $z_1$ to $z_n$. Amplifying the amplitudes of the analog signals $z_1$ to $z_n$ may correspond to performing annealing (simulated annealing).

Figure 2:
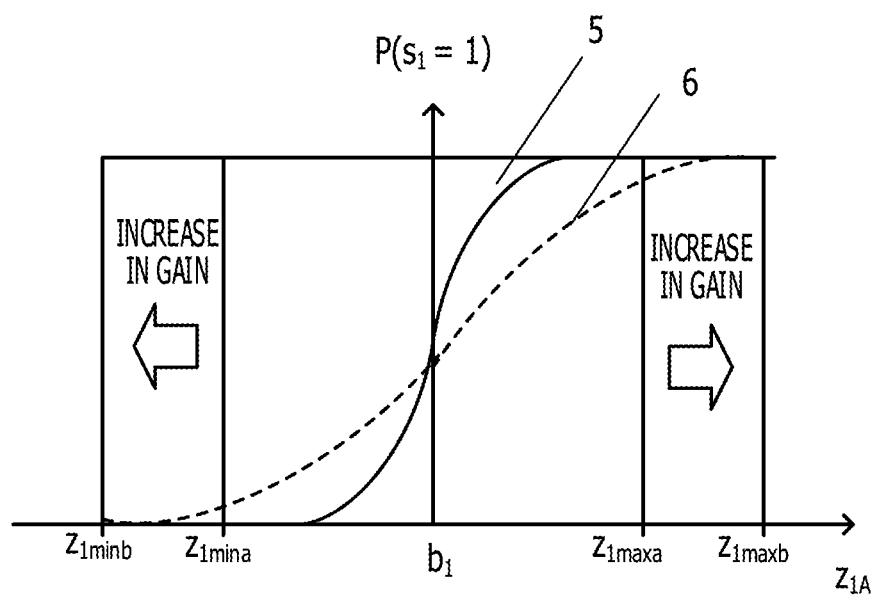
FIG. 2 illustrates an example of simulated annealing.

FIG. 2 illustrates an example of simulated annealing. In FIG. 2, simulated annealing performed by amplifying the amplitudes of analog signals is illustrated. In FIG. 2, the probability P that the state $s_1$ of the circuit unit $2a1$ is equal to 1 is illustrated.

The vertical axis represents the probability P and the horizontal axis represents the amplitude value $z_{1A}$ of the analog signal $z_1$. As represented by a waveform 5, the larger the amplitude value $z_{1A}$ relative to a threshold $b_1$, the larger the probability P that the state $s_1$ is equal to 1, and the smaller the amplitude value $z_{1A}$ relative to the threshold $b_1$, the smaller the probability P. As the amplitude value $z_{1A}$ approaches the threshold $b_1$, the probability that the state $s_1$ is equal to 1 and the probability that the state $s_1$ is equal to 0 become equal. Such a characteristic is based on device noise of the comparator $2d1$.

For example, simulated annealing gradually increases the probability that the state of each unit is equal to either 1 or 0 (the probability that the state is determined) by gradually decreasing a temperature parameter.

To perform simulated annealing by using circuits, the magnitude of noise may be changed such that the waveform of the probability P is changed from a waveform 6 to the waveform 5. In such a case, however, a circuit or the like that adds noise may be added. For example, the Boltzmann machine circuit 1 increases the amplitude value $z_{1A}$ (amplifies the amplitude) of the analog signal $z_1$, which is input to the comparator $2d1$, to increase the probability that the state $s_1$ is equal to either 1 or 0.

The control circuit 4, for example, increases the gain of the DAC $2c1$ to increase the amplitude value $z_{1A}$ of the analog signal $z_1$ in the minus direction from $z_{1mina}$ to $z_{1minb}$ and in the plus direction from $z_{1maxa}$ to $z_{1maxb}$. Thus, the probability that the state $s_1$ is equal to either 1 or 0 based on the analog signal $z_1$ equivalently increases. For example, amplifying the amplitude of the analog signal $z_1$ may correspond to decreasing a temperature parameter, and simulated annealing may be equivalently performed.

FIG. 1 is used to illustrate an example of operations of the Boltzmann machine circuit 1 when an optimal solution is determined by simulated annealing. For example, in FIG. 1, examples of energy waveforms 10, 11, and 12 when the values of output amplitudes of the DAC $2c1$ to $2cn$ (amplitude values of the analog signals $z_1$ to $z_n$) are min, mid (>min), and max (>mid). The vertical axis represents energy E and the horizontal axis represents a combination $s_K$ of the states $s_1$ to $s_n$ of n circuit units $2a1$ to $2an$. Additionally, in FIG. 1, examples of a dispersion w1 in the energy E resulting from unevenness among determination results based on device noise of the comparators $2d1$ to $2dn$ illustrated in FIG. 2 are illustrated.

When the output amplitudes of the DACs $2c1$ to $2cn$ are min, for example, when the control circuit 4 sets a reference voltage Vref, by which the addition results $z_{1d}$ to $z_{nd}$ are multiplied in the DACs $2c1$ to $2cn$, to 0, the energy waveform 10 is within the range of the dispersion w1. In this case, convergence to a solution (the combination $s_K$) that minimizes the energy E is not performed.

When the output amplitudes of the DACs $2c1$ to $2cn$ are mid, in the energy waveform 11, the energy E is within the range of the dispersion w1 when the combination $s_K$ is $s_{K1}$, and therefore convergence to this solution (local solution) is not performed. When the combination $s_K$ is $s_{K2}$, the energy E is outside the range of the dispersion w1, and therefore convergence to this solution is performed.

When the output amplitudes of the DACs $2c1$ to $2cn$ are max, in the energy waveform 12, convergence to the combination $s_{K2}$ is finished, and the combination $s_{K2}$ is obtained as an optimum solution. In such a manner, amplifying the output amplitudes of the DAC $2c1$ to $2cn$ may correspond to annealing in which a change is made from high temperature to low temperature.

The Boltzmann machine circuit 1 amplifies the amplitudes of the analog signals $z_1$ to $z_n$ input to the comparators $2d1$ to $2dn$, which are the output stages of the circuit units $2a1$ to $2an$, and makes use of noise of the comparators $2d1$ to $2dn$ to equivalently perform annealing. Therefore, noise generators or the like become unnecessary, which may reduce the circuit scale.

Since the analog circuits included in the circuit units $2a1$ to $2an$ are only the DACs $2c1$ to $2cn$ and the comparators $2d1$ to $2dn$, high-density implementation through a microfabrication process may be performed. Signals transmitted and received between the circuit units $2a1$ to $2an$ are digital signals, and therefore the flexibility of wiring increases, which may further reduce the circuit scale.

Figure 3:
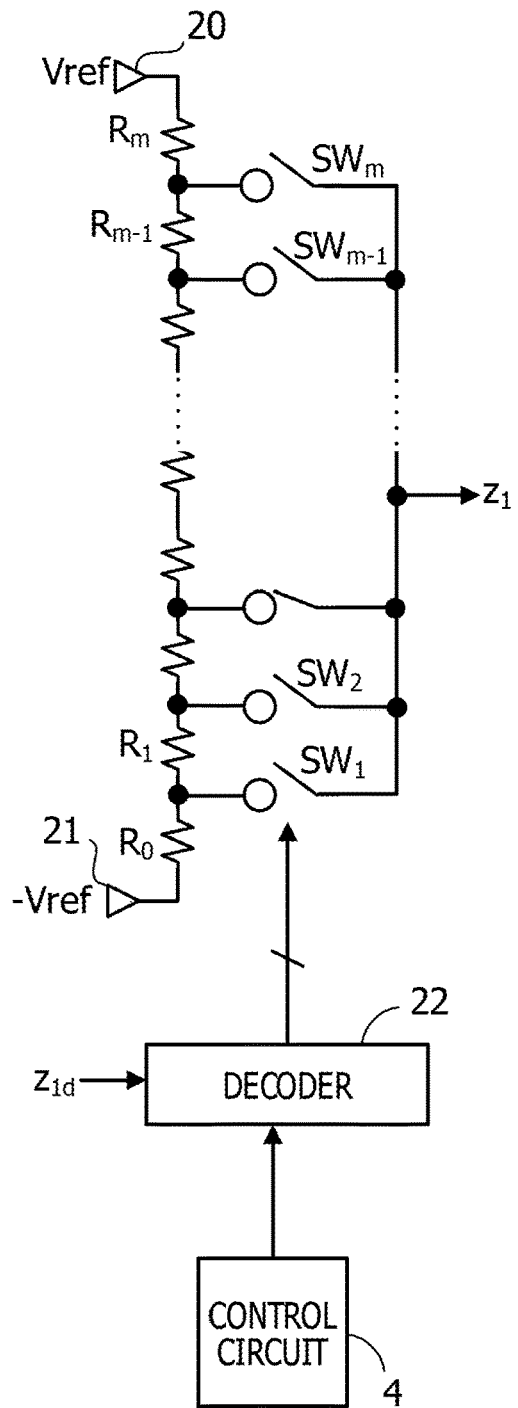
FIG. 3 illustrates an example of a digital-to-analog converter (DAC)

For example, the DACs $2c1$ to $2cn$ capable of varying the amplitudes of the analog signals z1 to zn are provided. FIG. 3 illustrates an example of the DAC.

The DAC $2c1$ includes resistive elements $R_0$, $R_1$, ..., $R_{m-1}$, $R_m$ coupled in series between terminals 20 and 21 to which reference voltages Vref and −Vref are applied, and switches $SW_1$, $SW_2$, ..., $SW_{m-1}$, $SW_m$ one end of each of which is coupled to a node between the resistive elements and the other ends of which are commonly coupled. The DAC $2c1$ further includes a decoder 22. The analog signal $z_1$ is output from the other ends of the switches $SW_1$ to $SW_m$.

Among the resistive elements $R_0$ to $R_m$, the resistive elements $R_1$ to $R_{m-1}$ may have the same resistance, and the resistances of the resistive elements $R_0$ and $R_m$ may each be half the resistance of each of the resistive elements $R_1$ to $R_{m-1}$. The switches $SW_1$ to $SW_m$ are turned on or off based on signals from the decoder 22. The switches $SW_1$ to $SW_m$ are implementable as metal-oxide-semiconductor field-effect transistors (MOSFETs).

Upon receipt of the addition result $z_{1d}$ (digital value) at the digital addition circuit $2b1$, the decoder 22 turns on any one of the switches $SW_1$ to $SW_m$ so that the analog signal $z_1$ corresponding to the magnitude of the addition result $z_{1d}$ is output. At this point, the amplitude value $z_{1A}$ of the analog signal $z_1$ is expressed as in the following equation (2).

$$z_{1A}=(Z_{1dA}+0.5)\times\{Vref-(-Vref)\}/2^m+(-Vref)=2\times(z_{1dA}+0.5)/2^m)\times Vref-Vref \quad (2)$$

Note that, in equation (2), $z_{1dA}$ represents the value of the addition result $z_{1d}$.

When simulated annealing is performed, the decoder 22 receives a control signal from the control circuit 4 and controls the switches $SW_1$ to $SW_m$ so that gain increases, for example, so that the amplitude value $z_{1A}$ increases. In such a way, in the DAC $2c1$ in FIG. 3, the decoder 22 controls the switches $SW_1$ to $SW_m$, which resistance divide the reference voltage Vref, based on a control signal from the control circuit 4, so that the amplitude value $z_{1A}$ increases.

Figure 4:
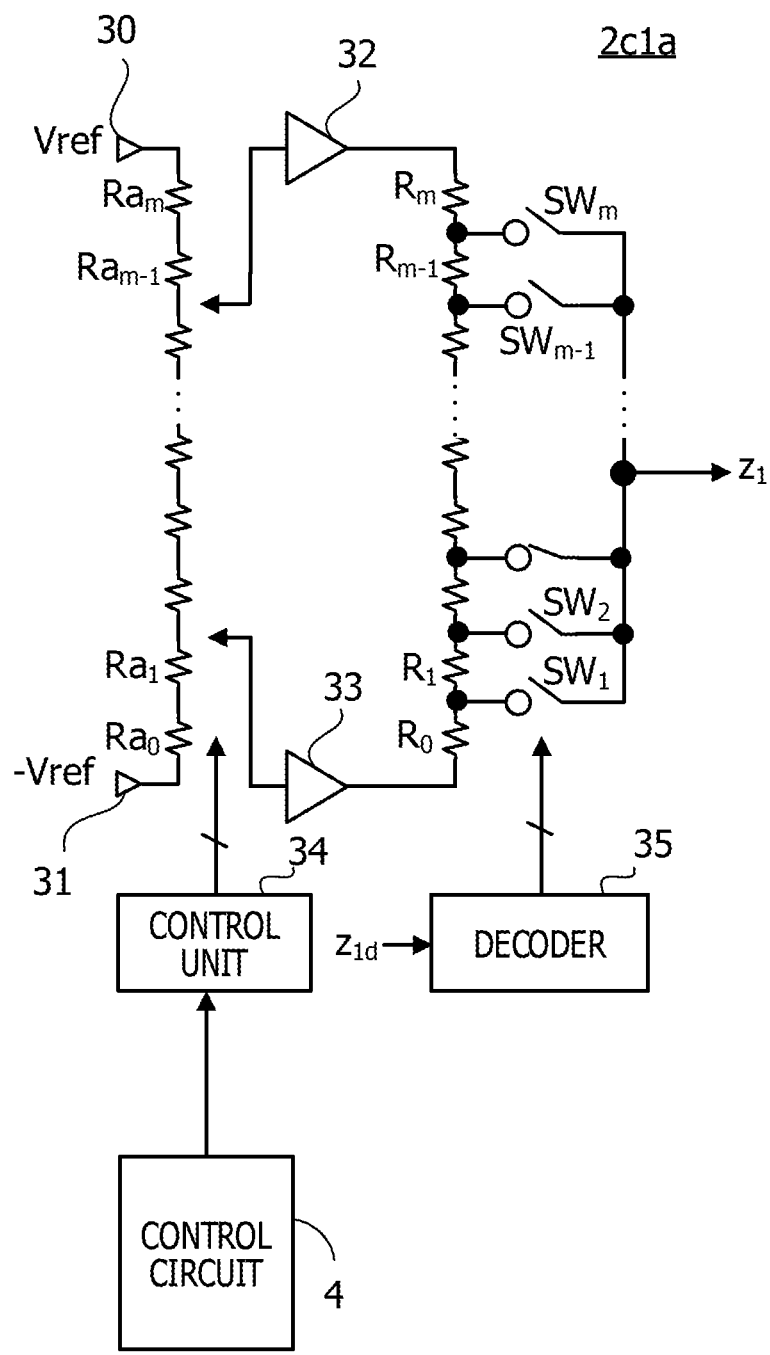
FIG. 4 illustrates an example of a DAC.

FIG. 4 illustrates an example of the DAC. In a DAC $2c1a$ in FIG. 4, elements similar to those of the DAC $2c1$ illustrated in FIG. 3 may be denoted by the same reference characters.

The DAC $2c1a$ includes resistive elements $Ra_0$, $Ra_1$, ..., $Ra_{m-1}$, $Ra_m$ coupled in series between terminals 30 and 31 to which the reference voltages Vref and −Vref are applied, buffer circuits 32 and 33, a control unit 34, and a decoder 35.

Based on control signals from the control circuit 4, the control unit 34 controls turning on or off of switches to cause the input terminals of the buffer circuits 32 and 33 to be coupled to the terminal of any one of the resistive elements $Ra_0$ to $Ra_m$.

In the DAC $2c1a$ in FIG. 4, the resistive elements $R_0$ to $R_m$ are coupled in series between the output terminals of the buffer circuits 32 and 33. Upon receipt of the addition result $z_{1d}$ at the digital addition circuit $2b1$, the decoder 35 turns on any one of the switches $SW_1$ to $SW_m$ so that the analog signal $z_1$ corresponding to the magnitude of the addition result $z_{1d}$ is output.

Given that the voltage of an output terminal of the buffer circuit 32 is Vrefa=$k_G$×Vref (the voltage of an output terminal of the buffer circuit 33 is −Vrefa=$k_G$×−Vref), an amplitude value $z_{1B}$ of the analog signal $z_1$ is expressed as the following equation (3).

$$z_{1B}=2\times(z_{1dA}+0.5)/2^m)\times Vrefa-Vrefa=k_G\{2\times(z_{1dA}+0.5)/2^m)\times Vref-Vref\} \quad (3)$$

When simulated annealing is performed, the control unit 34 receives a control signal from the control circuit 4 and determines the destination of coupling of the buffer circuits 32 and 33 so that Vrefa increases, for example, so that $k_G$ increases, thereby increasing the amplitude value $z_{1B}$.

For example, a method for learning the weight values $w_{1n}$ to $w_{n1}$ illustrated in FIG. 1 is provided. At the time of learning weight values in a Boltzmann machine, a weight value is changed using a probability $P_{ij}$ that any i-th and j-th units included in a network simultaneously fire, for example, that the state is equal to 1. For example, learning weight values may be executed by using circuits described below.

Figure 5:
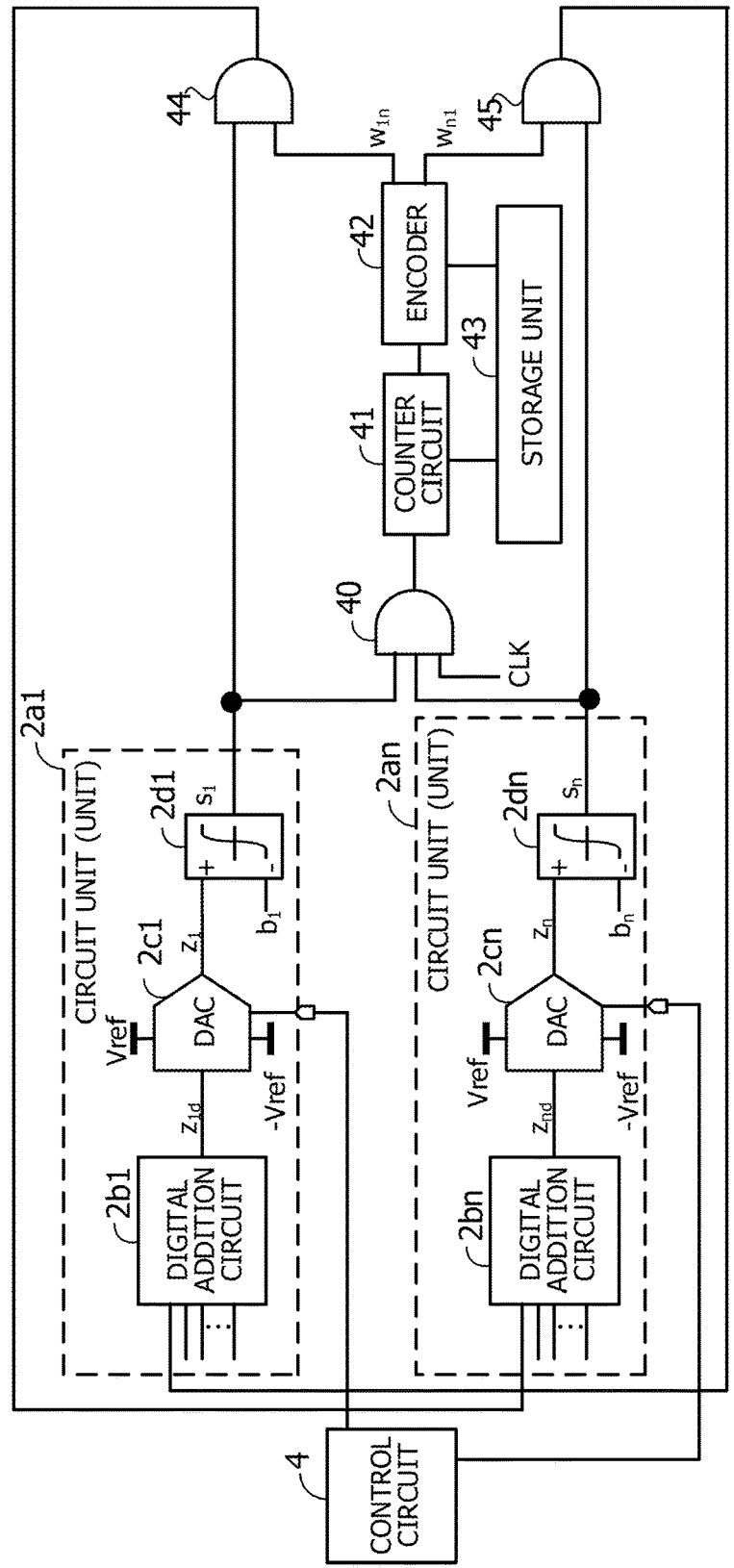
FIG. 5 illustrates an example of a Boltzmann machine circuit including a circuit that learns weight values.

FIG. 5 illustrates an example of a Boltzmann machine circuit including a circuit that learns weight values. In a Boltzmann machine circuit is illustrated in FIG. 5, elements similar to those of the Boltzmann machine circuit 1 illustrated in FIG. 1 may be denoted by the same reference characters.

In FIG. 5, a circuit that learns the weight values $w_{1n}$ and $w_{n1}$ applied to outputs of the circuit units $2a1$ and $2an$ is illustrated; however, the similar circuit may be used for the cases where a weight value applied to an output of another circuit unit (unit) is learned.

The Boltzmann machine circuit $1a$ includes an AND circuit 40, a counter circuit 41, an encoder 42, a storage unit 43, and AND circuits 44 and 45. The AND circuit 40 receives outputs of the circuit units $2a1$ and $2an$ and a clock signal CLK supplied from outside the Boltzmann machine circuit $1a$, and outputs an AND logical operation result of the outputs and the signal.

The counter circuit 41 counts the number of times the AND circuit 40 is turned to 1. The encoder 42 generates the weight values $w_{1n}$ and $w_{n1}$ based on a count result in the counter circuit 41.

The storage unit 43 stores a count result obtained in the counter circuit 41 and the weight values $w_{1n}$ and $w_{n1}$ generated in the encoder 42. The AND circuit 44 may correspond to the digital arithmetic circuit $3a1$ illustrated in FIG. 1 and supplies an AND logical operation result of an output (the state $s_1$) of the circuit unit $2a1$ and the weight value $w_{1n}$, as a digital value of 1 or 0, to the circuit unit $2an$.

The AND circuit 45 may correspond to the digital arithmetic circuit $3an$ illustrated in FIG. 1 and supplies an AND logical operation result of an output (the state $s_n$) of the circuit unit $2an$ and the weight value $w_{n1}$, as a digital value of 1 or 0, to the circuit unit $2a1$.

In such the Boltzmann machine circuit $1a$, a probability $P_{1n}$ that the circuit units $2a1$ and $2an$ are simultaneously turned to 1 is expressed by equation (4) given below.

$$P_{1n}=C/(t\times f_{CK}) \quad (4)$$

In equation (4), C represents the counted value of the counter circuit 41, t represents the counting time in the counter circuit 41, and $f_{CK}$ represents the frequency of the clock signal CLK.

At the time of learning the weight values $w_{1n}$ to $w_{n1}$, the control circuit 4 controls outputs of the DACs $2c1$ to $2cn$ to set the states $s_1$ to $s_n$ of the circuit units $2a1$ to $2an$ to a particular bit pattern with which the states $s_1$ to $s_n$ of the circuit units $2a1$ to $2an$ are learned. Then, the control circuit 4 performs simulated annealing to cause a network composed of the circuit units $2a1$ to $2an$ to reach thermal equilibrium, for example, the state in which the output amplitude of the DAC in FIG. 1=max.

The encoder 42 determines the probability $P_{1n}$ that the circuit units $2a1$ and $2an$ at this point are simultaneously turned to 1, based on equation (4). The control circuit 4 changes the bit pattern for learning and performs the similar processing to cause the network to reach thermal equilibrium. Further, the encoder 42 determines the probability $P_{1n}$ again (the probability determined again is referred to as a probability $Pa_{1n}$) and adjusts the weight values $w_{1n}$ and $w_{n1}$ based on a difference between the probability $P_{1n}$ and the probability $Pa_{1n}$.

The Boltzmann machine circuit is repeats processing as described above and finishes learning, for example, at a point when the difference between the probability $P_{1n}$ and the probability $Pa_{1n}$ becomes smaller than a given value. As described above, using the Boltzmann machine circuit 1a, learning weight values is performed.

Figure 6:
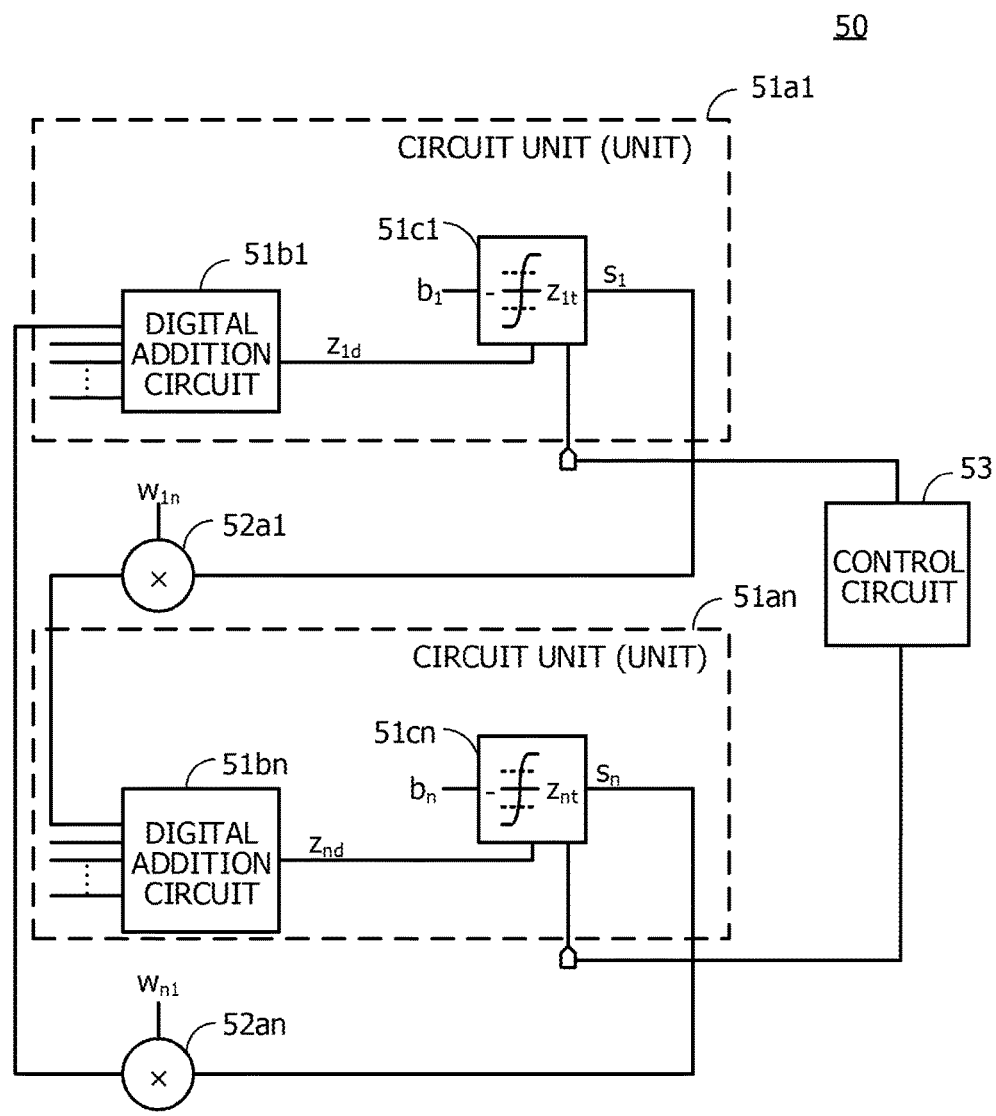
FIG. 6 illustrates an example of a Boltzmann machine circuit.

FIG. 6 illustrates an example of a Boltzmann machine circuit. A Boltzmann machine circuit 50 includes circuit units 51a1 to 51an, digital arithmetic circuits 52a1 to 52an, and a control circuit 53.

The circuit units 51a1 to 51an may correspond to n unites included in a Boltzmann machine network. Each of the circuit units 51a1 to 51an adds digital values based on outputs of circuit units other than the circuit unit among the circuit units 51a1 to 51an. Each of the circuit units 51a1 to 51an generates (determines) the values of determination thresholds $z_{1t}$ to $z_{nt}$ for comparison with thresholds $b_1$ to $b_n$, based on addition results, and outputs comparison results between the thresholds $b_1$ to $b_n$ and the determination thresholds $z_{1t}$ to $z_{nt}$.

For example, the circuit units 51a1 and 51an include digital addition circuits 51b1 and 51bn and comparators 51c1 and 51cn with threshold adjustment capabilities. The digital addition circuit 51b1 adds digital values based on outputs of circuit units other than the circuit unit 51a1 among the circuit units 51a1 to 51an. The digital addition circuit 51bn adds digital values based on outputs of circuit units other than the circuit unit 51an among the circuit units 51a1 to 51an.

The comparator 51c1 generates the determination threshold $z_{1t}$ based on the addition result $z_{1d}$ and, based on a comparison between the determination threshold $z_{1t}$ and the threshold $b_1$, outputs the comparison result of 1 or 0 as the state $s_1$ of the circuit unit 51a1. The comparator 51cn generates the determination threshold $z_{nt}$ based on the addition result $z_{nd}$ and, based on a comparison between the determination threshold $z_{nt}$ and the threshold $b_n$, outputs the comparison result of 1 or 0 as the state $s_n$ of the circuit unit 51an.

Among the circuit units 51a1 to 51an, circuit units other than the circuit units 51a1 and 51an may include the similar elements. The digital arithmetic circuits 52a1 to 52an may include features similar to those of the digital arithmetic circuits 3a1 to 3an illustrated in FIG. 1.

The control circuit 53 increases the rates of variations in the determination thresholds $z_{1t}$ to $z_{nt}$ relative to variations in the addition results $z_{1d}$ to $Z_{nd}$ in the digital addition circuits 51b1 to 51bn in the circuit units 51a1 to 51an, respectively. In such a way, the control circuit 53 equivalently performs annealing. The control circuit 53 may be, for example, a processor.

For example, the control circuit 53 gradually increases gain of the comparators 51c1 to 51cn to increase the rates of variations in the determination thresholds $z_{1t}$ to $z_{nt}$ relative to variations in the addition results $z_{1d}$ to $z_{nd}$.

Increasing the rates of variations in the determination thresholds $z_{1t}$ to $z_{nt}$ relative to variations in the addition results $z_{1d}$ to $z_{nd}$ may correspond to performing annealing (simulated annealing).

Figure 7:
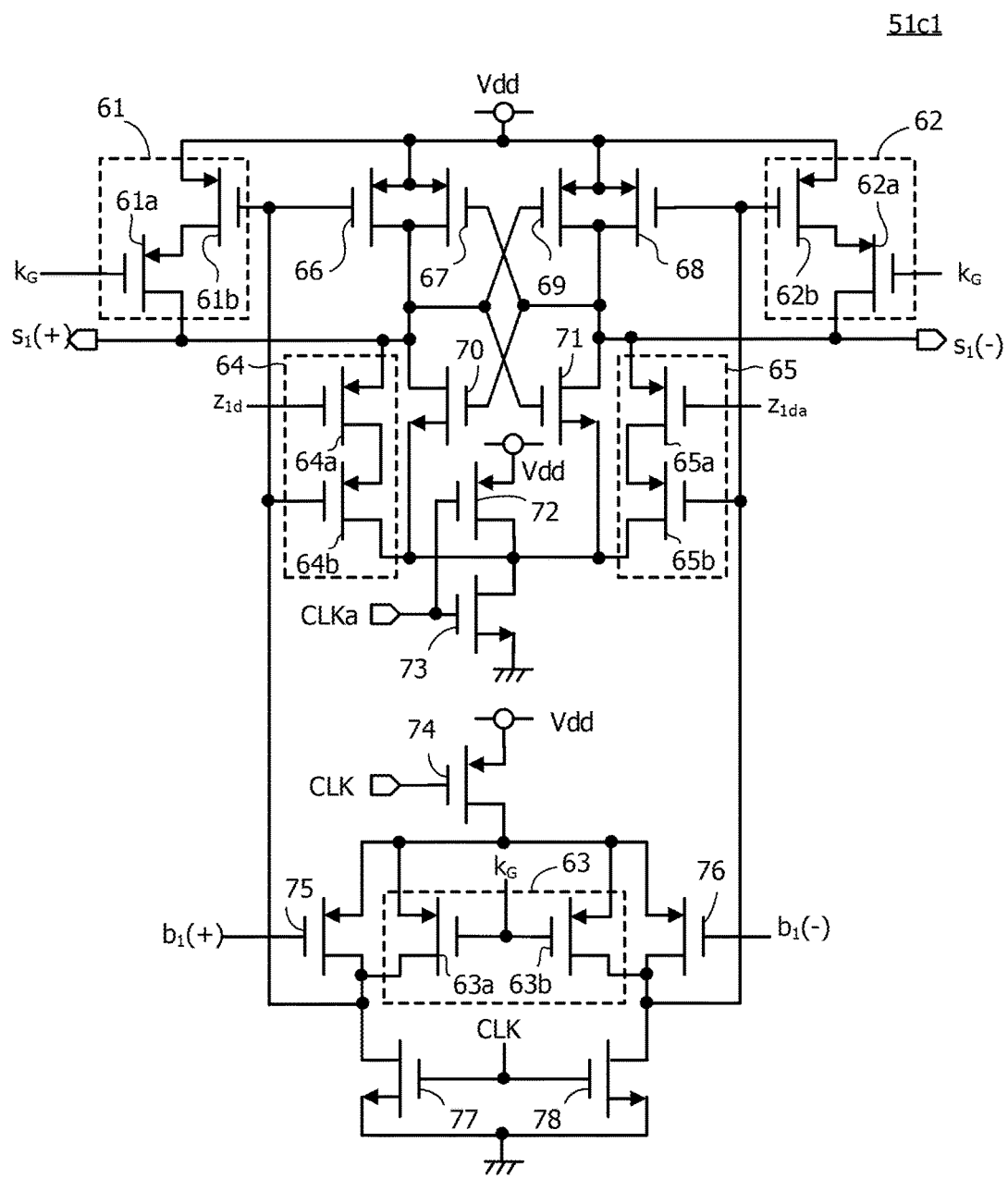
FIG. 7 illustrates an example of a comparator with a threshold adjustment capability.

FIG. 7 illustrates an example of a comparator with a threshold adjustment capability. The comparator illustrated in FIG. 7 may be the comparator 51c1 illustrated in FIG. 6, and another comparator illustrated in FIG. 6 may have a configuration similar to the illustrated comparator. Thresholds $b_1$ (+) and $b_1$ (−), which are differential input signals to the comparator 51c1 in FIG. 7, correspond to the threshold $b_1$ illustrated in FIG. 6. States $s_1$ (+) and $s_1$ (−), which are differential output signals from the comparator 51c1, correspond to the state $s_1$ illustrated in FIG. 6.

The comparator 51c1 includes gain control units 61, 62, and 63, threshold control units 64 and 65, transistors 66, 67, 68, 69, 70, 71, 72, 73, 74, 75, 76, 77, and 78. The transistors 66 to 69, 72, 74, 75, and 76 are p-channel MOSFETs, and the transistors 70, 71, 73, 77 and 78 are n-channel MOSFETs.

The gain control unit 61 includes transistors 61a and 61b. The transistors 61a and 61b may be p-channel MOSFETs. The source of the transistor 61a is coupled to the drain of the transistor 61b, and the drain of the transistor 61a is coupled to the drains of the transistors 66 and 67, the gates of the transistors 69 and 71, the drain of the transistor 70, and the threshold control unit 64. The gate of the transistor 61a is coupled to the control circuit 53 illustrated in FIG. 6. The transistor 61a is turned on or off depending on a control signal $k_G$ supplied from the control circuit 53. A power supply voltage Vdd is applied to the source of the transistor 61b, and the gate of the transistor 61b is coupled to the gain control unit 63, the threshold control unit 64, the gate of the transistor 66, and the drains of the transistors 75 and 77.

For example, the gain control unit 61 may include one or more pairs similar to the pair of the transistors 61a and 61b coupled as mentioned above, and a pair that is turned on by the control signal $k_G$ of a plurality of bits may be selected.

The gain control unit 62 includes transistors 62a and 62b. The transistors 62a and 62b may be p-channel MOSFETs. The source of the transistor 62a is coupled to the drain of the transistor 62b, and the drain of the transistor 62a is coupled to the drains of the transistors 68 and 69, the gates of the transistors 67 and 70, the drain of the transistor 71, and the threshold control unit 65. The gate of the transistor 62a is coupled to the control circuit 53 illustrated in FIG. 6. The transistor 62a is turned on or off depending on the control signal $k_G$ supplied from the control circuit 53. The power supply voltage Vdd is applied to the source of the transistor 62b, and the gate of the transistor 62b is coupled to the gain control unit 63, the threshold control unit 65, the gate of the transistor 68, and the drains of the transistors 76 and 78.

Similarly to the gain control unit 61, the gain control unit 62 may include one or more pairs similar to the pair of the transistors 62a and 62b as mentioned above, and a pair that is turned on by the control signal $k_G$ of a plurality of bits may be selected.

The gain control unit 63 includes transistors 63a and 63b, which are p-channel transistors. The sources of the transistors 63a and 63b are coupled to the drain of the transistor 74 and the sources of the transistors 75 and 76. The drain of the transistor 63a is coupled to the gates of the transistors 61b and 66, the threshold control unit 64, and the drains of the transistors 75 and 77. The drain of the transistor 63b is coupled to the gates of the transistors 62b and 68, the threshold control unit 65, and the drains of the transistors 76 and 78. The gates of the transistors 63a and 63b are coupled to the control circuit 53 illustrated in FIG. 6. The transistors 63a and 63b are turned on or off depending on the control signal $k_G$ supplied from the control circuit 53.

The gain control unit 63 may include one or more pairs similar to the pair of the transistors 63a and 63b coupled as mentioned above, and a pair that is turned on by the control signal $k_G$ of a plurality of bits may be selected.

The threshold control unit 64 includes transistors 64a and 64b. Further, the threshold control unit 65 includes transistors 65a and 65b. The transistors 64a, 64b, 65a, and 65b may be p-channel MOSFETs.

The source of the transistor 64a is coupled to the drains of the transistors 61a, 66, 67 and 70 and the gates of the transistors 69 and 71. The source of the transistor 65a is coupled to the drains of the transistors 62a, 68, 69, and 71 and the gates of the transistors 67 and 70. The drain of the transistor 64a is coupled to the source of the transistor 64b. The drain of the transistor 65a is coupled to the source of the transistor 65b. The gate of the transistor 64a is coupled to the digital addition circuit 51b1. The transistor 64a is turned on or off depending on the addition result $z_{1d}$ supplied from the digital addition circuit 51b1. A value $z_{1da}$, which is opposite in logic level to the value of the addition result $z_{1d}$, is supplied to the gate of the transistor 65a. The drains of the transistors 64b and 65b are coupled to the sources of the transistors 70 and 71 and the drains of the transistors 72 and 73.

The power supply voltage Vdd is applied to the sources of the transistors 66 to 69. The drains of the transistors 66 and 67 are coupled to the drains of the transistors 61a and 70, the source of the transistor 64a, and the gates of the transistors 69 and 71. The drains of the transistors 68 and 69 are coupled to the drains of the transistors 62a and 71, the source of the transistor 65a, and the gates of the transistors 67 and 70.

The gate of the transistor 66 is coupled to the gate of the transistor 61b, the gate of the transistor 64b, and the drains of the transistors 63a, 75 and 77. The gate of the transistor 67 is coupled to the drains of the transistors 62a, 68, 69, and 71 and the source of the transistor 65a. The gate of the transistor 68 is coupled to the gate of the transistor 62b, the gate of the transistor 65b, and the drains of the transistors 63b, 76, and 78. The gate of the transistor 69 is coupled to the drains of the transistors 61a, 66, 67, and 70 and the source of the transistor 64a.

The drain of the transistor 70 is coupled to the drains of the transistors 61a, 66, and 67, the source of the transistor 64a, and the gates of the transistors 69 and 71. The drain of the transistor 71 is coupled to the drains of the transistors 62a, 68, and 69, the source of the transistor 65a, and the gates of the transistors 67 and 70. The sources of the transistors 70 and 71 are coupled to the drains of the transistors 64b, 65b, 72, and 73. The gate of the transistor 70 is coupled to the drains of the transistors 62a, 68, 69, and 71, the source of the transistor 65a, and the gate of the transistor 67. The gate of the transistor 71 is coupled to the drains of the transistors 61a, 66, 67, and 70, the source of the transistor 64a, and the gate of the transistor 69.

The power supply voltage Vdd is applied to the source of the transistor 72. The drains of the transistors 72 and 73 are coupled to the drains of the transistors 64b and 65b and the sources of the transistors 70 and 71, and a signal CLKa, which is opposite in logic level to the clock signal CLK, is supplied to the gates of the transistors 72 and 73. The source of the transistor 73 is grounded.

The power supply voltage Vdd is applied to the source of the transistor 74. The drain of the transistor 74 and the sources of the transistors 75 and 76 are coupled to the sources of the transistors 63a and 63b. The clock signal CLK is supplied to the gate of the transistor 74. The threshold $b_1$ (+) is supplied to the gate of the transistor 75, and the threshold $b_1$ (−) is supplied to the gate of the transistor 76.

The gates of the transistors 61b, 64b, and 66 and the drain of the transistor 63a are coupled to the drains of the transistors 75 and 77. The gates of the transistors 62b, 65b, and 68 and the drain of the transistor 63b are coupled to the drains of the transistors 76 and 78. The clock signal CLK is supplied to the gates of the transistors 77 and 78, and the sources of the transistors 77 and 78 are grounded.

In the comparator 51c1 as described above, the drain voltages of the transistors 61a and 62a are in the states $s_1$ (+) and $s_{1a}$(−), respectively, which are outputs of the comparator 51c1. Regular comparison operations of the comparator 51c1 are as described below.

When the logic level of the clock signal CLK is the H (high) level, both the transistors 77 and 78 are turned on and the gate voltages of the transistors 66 and 68 are at the L (low) level. Therefore, the states $s_1$ (+) and $s_{1a}$(−) are pulled up to the power supply voltage Vdd to be turned to "1". This state indicates the reset state of the comparator 51c1.

Once the logic level of the clock signal CLK transits from the H level to the L level, the transistors 77 and 78 are turned off and the transistor 74 is turned on. Therefore, currents flow between the sources and the drains of the transistors 75 and 76. The currents are controlled by the threshold $b_1$ (+) and $b_1$ (−). The potential difference based on a difference between the source-drain current of the transistor 75 and the source-drain current of the transistor 76 is amplified by a positive feedback loop of the transistors 66 to 71 or the like, the states $s_1$ (+) and $s_{1a}$ (−) finally result in the power supply voltage Vdd or the ground potential, and the determination is completed. In the regular comparison operations, the magnitude of the potential with respect to the thresholds $b_1$ (+) and $b_1$ (−) is determined in this way.

An example of threshold adjustment operations using the threshold control units 64 and 65 are as described below. The threshold control units 64 and 65 adjust currents flowing to the side of the drains of the transistors 61a and 62a, which is responsible for determining the states $s_1$ (+) and $s_{1a}$ (−), immediately after the logic level of the clock signal CLK is switched to the L level by the addition result $z_{1d}$ supplied from the digital addition circuit 51b1. Thus, the potential difference (hereinafter referred to as a determination threshold $z_{1t}$) between the thresholds $b_1$ (+) and $b_1$ (−) at which a comparison result is inverted is adjusted.

Next, an example of gain adjustment operations using the gain control units 61 to 63 are as described below. In the gain control unit 63, the larger the number of transistors that are turned on by the control signal $k_G$, such as the transistors 63a and 63b, the lower the gain.

Conversely, in the gain control units 61 and 62 coupled to the power supply voltage Vdd, the larger the number of transistors that are turned on the control signal $k_G$, such as the transistors 61a and 62a, the higher the gain. The number of transistors that are turned on may be the same between the gain control units 61 and 62.

Figure 8:
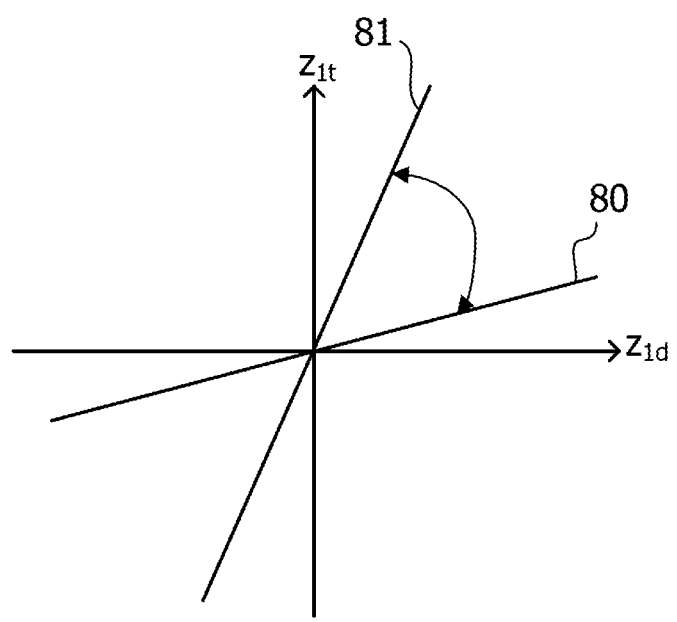
FIG. 8 illustrates an example of a difference in variations of a determination threshold relative to an addition result.

FIG. 8 illustrates an example of a difference in the variation in the determination threshold relative to the addition result. The horizontal axis represents the addition result $z_{1d}$ and the vertical axis represents the determination threshold $z_{1t}$. A straight line 80 represents a $z_{1d}$-$z_{1t}$ characteristic when the gain has a minimum value, and a straight line 81 represents the $z_{1d}$-$z_{1t}$ characteristic when the gain has a maximum value.

The addition result $z_{1d}$ supplied from the digital addition circuit 51b1 may function as a control signal for varying the determination threshold $z_{1t}$. In the straight line 81, the rate of variations in the determination threshold $z_{1t}$ relative to variations in the addition result $z_{1d}$ is larger than that in the straight line 80.

The control circuit 53 illustrated in FIG. 6 varies the gain from the minimum to the maximum using the control signal $k_G$ to increase the rate relative to variations of the addition result from the rate indicated by the straight line 80 to the rate indicated by the straight line 81.

Figure 9:
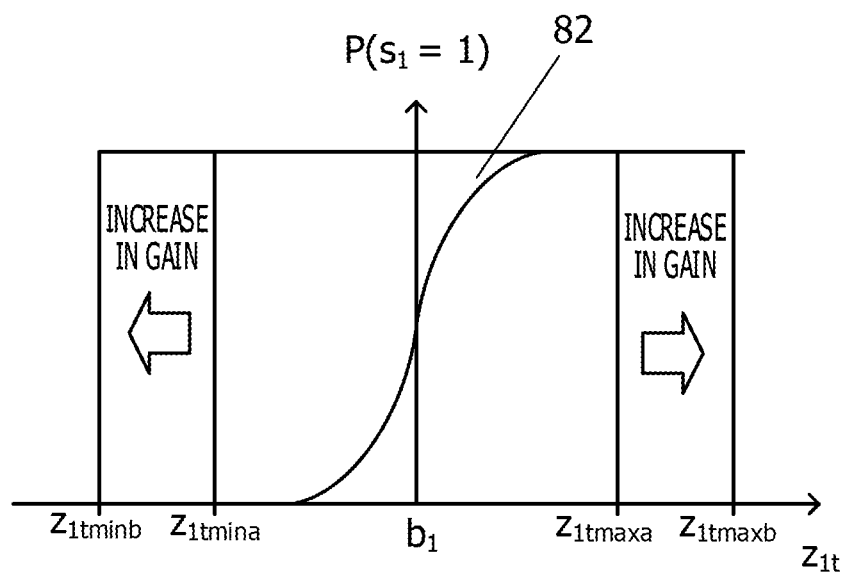
FIG. 9 illustrates an example of the probability.

FIG. 9 illustrates an example of the probability. In FIG. 9, the probability P that the state $s_1$ of the circuit unit 51$a$1 is equal to 1 is illustrated. The vertical axis represents the probability P and the horizontal axis represents the determination threshold $z_{1t}$. As represented by a waveform 82, the larger the determination threshold $z_{1t}$ relative to the threshold $b_1$, the larger the probability P that the state $s_1$ is equal to 1, and the smaller the determination threshold $z_{1t}$ relative to the threshold $b_1$, the smaller the probability P. As the determination threshold $z_{1t}$ approaches the threshold $b_1$, the probability that the state $s_1$ is equal to 1 and the probability that the state s1 is equal to 0 become equal. Such a characteristic is based on the device noise of the comparator 51$c$1.

Simulated annealing gradually increases the probability that each unit outputs either 1 or 0, by gradually decreasing a temperature parameter.

The Boltzmann machine circuit 50 increases the width of a variation in the determination threshold zit of the comparator 51$c$1 by increasing the gain, equivalently increasing the probability that the state s1 is equal to either 1 or 0.

The control circuit 53 increases the gain of the comparator 51$c$1 to increase the determination threshold $z_{1t}$ in the minus direction from $Z_{1tmina}$ to $Z_{1tminb}$ and increases it in the plus direction from $Z_{1tmaxa}$ to $Z_{1tmaxb}$. Thus, the probability that the state $s_1$ is equal to either 1 or 0 based on the determination threshold $z_{1t}$ increases equivalently. For example, increasing the width of a variation in the determination threshold zit may correspond to decreasing the temperature parameter, and simulated annealing may be performed.

Figure 10:
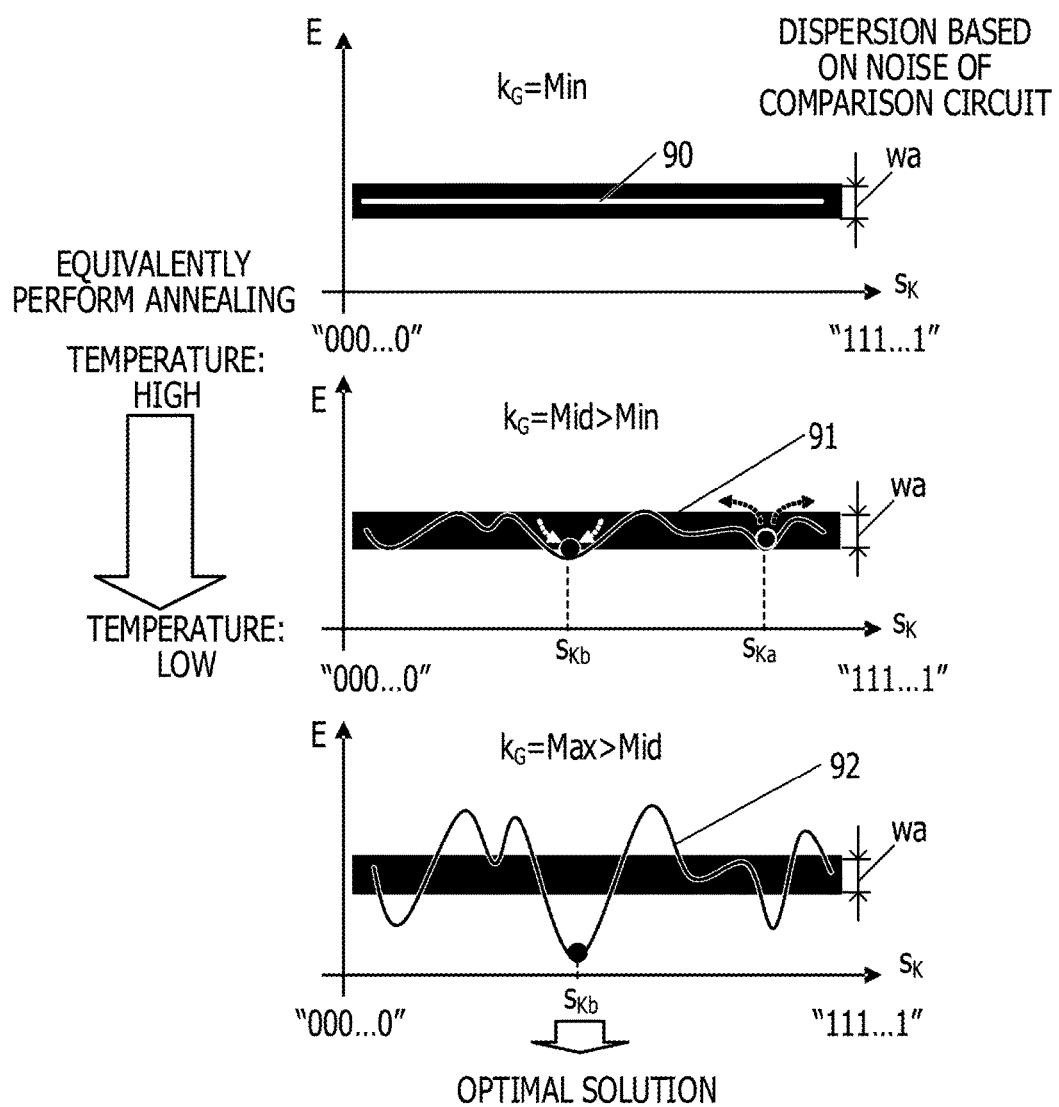
FIG. 10 illustrates an example of the operations of a Boltzmann machine circuit.

FIG. 10 illustrates an example of operations of a Boltzmann machine circuit. In FIG. 10, operations of a Boltzmann machine circuit when an optimal solution is determined by simulated annealing are illustrated. In FIG. 10, an example of energy waveforms 90, 91, and 92 when the control signal $k_G$ is Min (minimum gain), Mid (>Min), and Max (>Mid) (maximum gain). The vertical axis represents the energy E, and the horizontal axis represents the combination $s_K$ of the states $s_1$ to $s_n$ of n circuit units 51$a$1 to 51$an$. In FIG. 10, an example of a dispersion wa of the energy E resulting from unevenness among determination results based on the device noise of the comparators 51$c$1 to 51$cn$ is illustrated.

When the control signal $k_G$ is Min, the energy waveform 90 is within the range of the dispersion wa. In this case, convergence to a solution (the combination $s_K$) that minimizes the energy E is not performed.

When the control signal kG is Mid, in the energy waveform 91, the energy E is within the range of the dispersion wa when the combination $s_K$ is a combination $s_{Ka}$, and therefore convergence to this solution (local solution) is not performed. When the combination $s_K$ is a combination $s_{Kb}$, the energy E is outside the range of the dispersion wa, and therefore convergence to this solution is performed.

When the control signal $k_G$ is Max, in the energy waveform 92, convergence to the combination $s_{Kb}$ is finished, and the combination $s_{Kb}$ is obtained as an optimal solution. In such a manner, using the control signal $k_G$, increasing the gain of the comparators 51$c$1 to 51$cn$ to increase the rates of variations in the determination thresholds $z_{1t}$ to $z_{nt}$ relative to variations in the addition results $z_{1d}$ to $z_{nd}$ may correspond to annealing in which a change is made from high temperature to low temperature.

The Boltzmann machine circuit 50 increases the rates of variations in the determination thresholds $z_{1t}$ to $z_{nt}$ in the comparators 51$c$1 to 51$cn$ of the circuit units 51$a$1 to 51$an$ and makes use of noise of the comparators 51$c$1 to 51$cn$, equivalently performing annealing. Advantages similar to those of the Boltzmann machine circuit 1 illustrated in FIG. 1 are obtained and a DAC is unnecessary. Therefore, the circuit scale may be further reduced.

In the Boltzmann machine circuit 50, learning of weight values may be performed using the circuits illustrated in FIG. 5.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A Boltzmann machine circuit comprising:
    a plurality of circuits each circuit configured to add one or more first values based on one or more outputs of one or more circuits which are included in the plurality of circuits and are other than the circuit and convert an addition result into an analog signal, compare the analog signal with a second value, and output a comparison result;
    a plurality of arithmetic circuits configured to multiply the respective comparison results by respective weight values and generate the first values; and
    a control circuit configured to amplify an amplitude of the analog signal generated by each of the plurality of circuits,
    wherein each of the plurality of circuits includes:
        a digital addition circuit configured to add the first values corresponding to digital values;
        a digital-analog converter configured to convert the addition result output from the digital addition circuit into the analog signal; and
        a comparator configured to compare the analog signal output from the digital-analog converter with the second value.

2. The Boltzmann machine circuit according to claim 1, wherein the control circuit equivalently performs annealing by amplifying the amplitude of the analog signal.

3. The Boltzmann machine circuit according to claim 1, wherein the control circuit increases gain of the digital-analog converter to amplify the amplitude of the analog signal.

4. The Boltzmann machine circuit according to claim 1, wherein each of the plurality of arithmetic circuits includes an AND circuit to which the comparison result and the weight value are input.

5. The Boltzmann machine circuit according to claim 1, further comprising:
    a learning circuit configured to calculate, based on the comparison results from the plurality of circuits, the weight value to be supplied to each of the plurality of arithmetic circuits.

6. The Boltzmann machine circuit according to claim 5, wherein the learning circuit includes: an AND circuit configured to receive the comparison results from the plurality of circuits; a counter circuit configured to count an output of the AND circuit; and an encoder configured to output the weight values based on an output of the counter circuit.

* * * * *